(12) United States Patent
Pitrone et al.

(10) Patent No.: US 6,534,712 B1
(45) Date of Patent: Mar. 18, 2003

(54) PRESSURE VESSEL JOINT FOR REPEATERS IN SUBMARINE OPTICAL COMMUNICATION SYSTEMS

(75) Inventors: Perry A. Pitrone, Hampstead, MD (US); Steven Brown, Crownsville, MD (US); Mark McGinnis, Bowie, MD (US)

(73) Assignee: Corvis Corporation, Columbia, MD (US)

( * ) Notice: Subject to any disclaimer, the term of this patent is extended or adjusted under 35 U.S.C. 154(b) by 0 days.

(21) Appl. No.: 09/969,152

(22) Filed: Oct. 3, 2001

(51) Int. Cl.[7] .................................................. H05K 5/00
(52) U.S. Cl. ..................... 174/70 S; 385/138
(58) Field of Search .................. 174/70 S; 385/76, 385/135, 138; 361/722

(56) References Cited

U.S. PATENT DOCUMENTS

| | | | | |
|---|---|---|---|---|
| 2,886,626 A | * | 5/1959 | Burnett et al. ............ | 174/70 S |
| 2,945,082 A | * | 7/1960 | Geyling ................. | 174/152 R |
| 3,168,614 A | * | 2/1965 | Munn et al. ............ | 174/102 R |
| 3,258,520 A | * | 6/1966 | Jarvis ..................... | 174/70 S |
| 4,029,894 A | * | 6/1977 | Jarvis et al. ............. | 174/70 S |
| 4,103,104 A | * | 7/1978 | Spollen ................... | 174/70 S |
| 4,253,729 A | * | 3/1981 | Rocton ..................... | 174/70 S |
| 4,259,543 A | * | 3/1981 | Oldham ................... | 174/70 S |
| 4,505,540 A | * | 3/1985 | Furusawa et al. ........... | 385/134 |
| 4,598,290 A | * | 7/1986 | Collins et al. ............. | 174/11 R |
| 4,632,507 A | * | 12/1986 | Mignien et al. ............ | 385/135 |
| 4,722,590 A | * | 2/1988 | Thomas ..................... | 385/107 |
| 4,757,157 A | * | 7/1988 | Pelet ....................... | 174/50 |
| 4,830,455 A | * | 5/1989 | Jenkins ................... | 385/139 |
| 4,962,445 A | * | 10/1990 | Pelet et al. ............. | 174/70 S |
| 5,105,337 A | * | 4/1992 | Bitler et al. ............ | 174/70 S |
| 5,110,224 A | * | 5/1992 | Taylor et al. ............ | 174/70 S |
| 5,301,959 A | * | 4/1994 | Gould ...................... | 174/77 R |
| 5,642,219 A | | 6/1997 | Ogiya et al. ................ | 359/341 |
| 5,675,120 A | * | 10/1997 | Craft et al. ................ | 174/52.1 |
| 6,094,519 A | * | 7/2000 | Takeda ....................... | 385/138 |
| 6,131,297 A | * | 10/2000 | Yamamoto et al. ........... | 33/324 |
| 6,290,399 B1 | * | 9/2001 | Ogiya ....................... | 174/70 S |

OTHER PUBLICATIONS

AT&T Technical Journal: A Journal of the AT&T Companies, vol. 74, No. 1, Jan./Feb. 1995, 106 pages.

* cited by examiner

*Primary Examiner*—Anthony Dinkins
*Assistant Examiner*—Adolfo Nino
(74) *Attorney, Agent, or Firm*—Harrity & Snyder, L.L.P.

(57) ABSTRACT

A pressure vessel joint for repeaters in submarine optical communication systems is described. The joint employs a breech ring which secures an endcap to the pressure vessel. The breech ring and pressure vessel have corresponding keys. The breech ring slides over the endcap and is rotated such that the breech ring keys engage the mating keys formed in the pressure vessel. The endcap is seated on a preloaded C-ring which seals the secured structure. Additional, redundant piston seals can also be provided to further prevent leakage.

10 Claims, 11 Drawing Sheets

PRESSURE VESSEL JOINT FOR REPEATERS IN SUBMARINE OPTICAL COMMUNICATION SYSTEMS

BACKGROUND

From the advent of the telephone, people and businesses have craved communication technology and its ability to transport information in various formats, e.g., voice, image, etc., over long distances. Typical of innovations in communication technology, recent developments have provided enhanced communications capabilities in terms of the speed at which data can be transferred, as well as the overall amount of data being transferred. As these capabilities improve, new content delivery vehicles, e.g., the Internet, wireless telephony, etc., drive the provision of new services, e.g., purchasing items remotely over the Internet, receiving stock quotes using wireless short messaging service (SMS) capabilities etc., which in turn fuels demand for additional communications capabilities and innovation.

Recently, optical communications have come to the forefront as a next generation communication technology. Advances in optical fibers over which optical data signals can be transmitted, as well as techniques for efficiently using the bandwidth available on such fibers, such as wavelength division multiplexing (WDM), have resulted in optical technologies being the technology of choice for state-of-the-art long haul communication systems.

For long haul optical communications, e.g., greater than several hundred kilometers, the optical signal must be periodically amplified to compensate for the tendency of the data signal to attenuate. For example, in the submarine optical communication system 10 shown in FIG. 1, the terrestrial signal is processed in WDM terminal 12 for transmission via optical fiber 14. Periodically, e.g., every 75 km, a repeater 16 amplifies the transmitted signal so that it arrives at WDM terminal 18 with sufficient signal strength (and quality) to be successfully transformed back into a terrestrial signal.

Figure 2A:
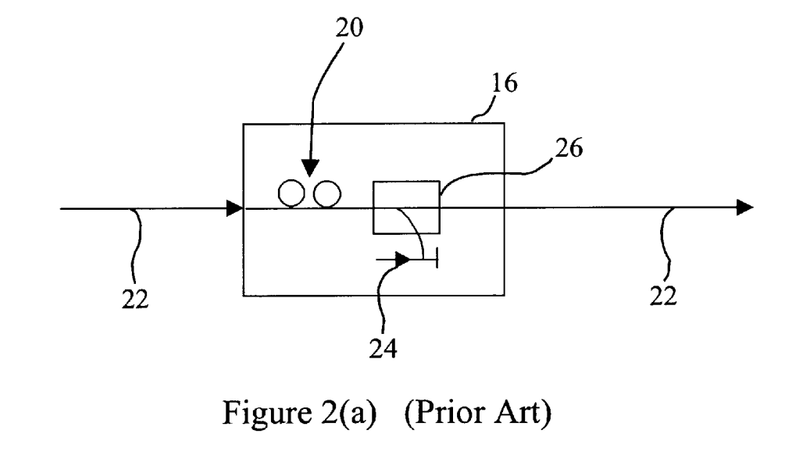
FIG. 2(a) is a conceptual diagram of a conventional erbium-doped fiber amplifier.

Conventionally, erbium-doped fiber amplifiers (EDFAs) have been used for amplification in the repeaters 16 of such systems. As seen in FIG. 2(a), an EDFA employs a length of erbium-doped fiber 20 inserted between the spans of conventional fiber 22. A pump laser 24 injects a pumping signal having a wavelength of, for example, approximately 1480 nm into the erbium-doped fiber 20 via a coupler 26. This pumping signal interacts with the f-shell of the erbium atoms to stimulate energy emissions that amplify the incoming optical data signal, which has a wavelength of, for example, about 1550 nm. One drawback of EDFA amplification techniques is the relatively narrow bandwidth within which this form of resonant amplification occurs, i.e., the so-called erbium spectrum. Future generation systems will likely require wider bandwidths than that available from EDFA amplification in order to increase the number of channels (wavelengths) available on each fiber, thereby increasing system capacity.

Figure 2B:
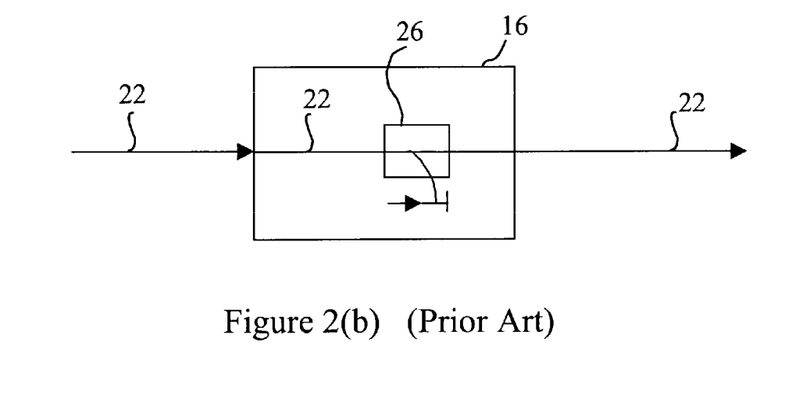
FIG. 2(b) is a conceptual diagram of a conventional Raman amplifier.

Distributed Raman amplification is one amplification scheme that can provide a broad and relatively flat gain profile over a wider wavelength range than that which has conventionally been used in optical communication systems employing EDFA amplification techniques. Raman amplifiers employ a phenomenon known as "stimulated Raman scattering" to amplify the transmitted optical signal. In stimulated Raman scattering, as shown in FIG. 2(b), radiation from a pump laser 24 interacts with a gain medium 22 through which the optical transmission signal passes to transfer power to that optical transmission signal. One of the benefits of Raman amplification is that the gain medium can be the optical fiber 22 itself, i.e., doping of the gain material with a rare-earth element is not required as in EDFA techniques. The wavelength of the pump laser 24 is selected such that the vibration energy generated by the pump laser beam's interaction with the gain medium 22 is transferred to the transmitted optical signal in a particular wavelength range, which range establishes the gain profile of the pump laser.

Although the ability to amplify an optical signal over a wide bandwidth makes Raman amplification an attractive option for next generation optical communication systems, the use of a relatively large number of high power pump lasers (and other components) for each amplifier in a Raman system has hitherto made EDFA amplification schemes the technology of choice for long haul optical communication systems. However, as the limits of EDFA amplification are now being reached, recent efforts have begun to explore the design issues associated with supplementing, or replacing, EDFA amplification technology with Raman amplification technology.

In order to design a wideband, Raman-amplified optical communication system, however, a much larger number of active and passive optical and electrical components need to be housed in each repeater 16 than were previously needed in conventional submarine optical communication systems. Additionally, the amount of optical fiber, and the number of fiber splices, needed to interconnect the optical components will also increase dramatically. For example, Applicants have estimated that implementation of wideband, Raman-amplified optical communication systems may require repeaters which have 150–300 (or more) lasers, 500 to 800 (or more) passive optical components and 600–900 (or more) optical splices.

Figure 3:
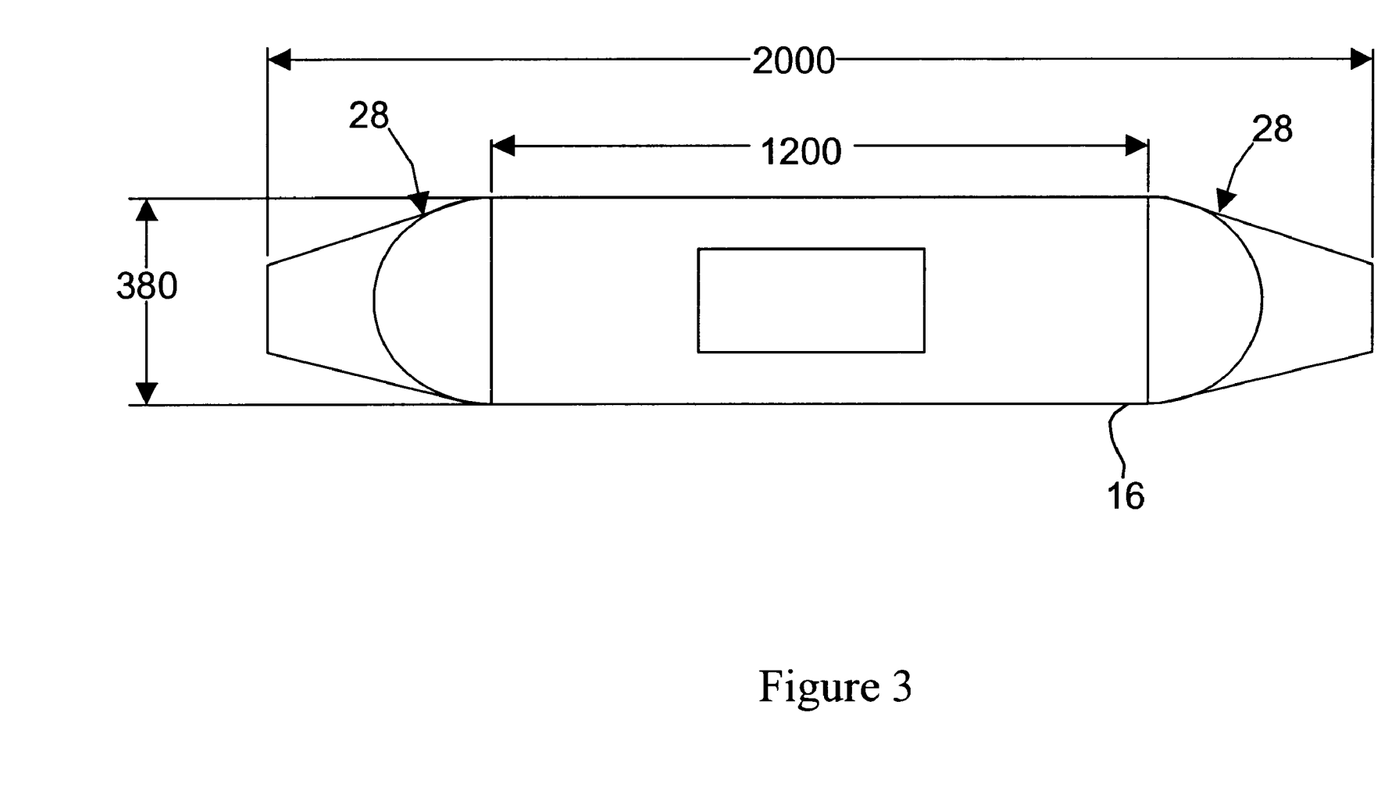
FIG. 3 is a depiction of a repeater showing dimensions thereof.

Even as the number of components, length of fiber and amount of power needed to operate those components has increased, the physical size of the repeater 16 is restricted by, for example, operational, deployment, transportation and storage considerations. Thus, according to exemplary embodiments of the present invention, it is preferable to design structures and techniques for accommodating the aforedescribed optical components and fiber (as well as other components) within a repeater 16 having substantially the dimensions (in millimeters) illustrated in FIG. 3.

Each repeater 16 typically also includes one or more removable endcaps 28. Conventionally, these endcaps can be secured to the body of the repeater 16 using threads, bolted flanges or both (not shown in FIG. 3). However, repeater endcaps having threaded connections require a large amount of torque to install. Moreover, repeater endcaps using bolted flanges increase the outer diameter of the repeater by the width of the flanges, which is undesirable for repeaters with restricted size that have a large number of components to house within their inner diameter.

Thus, it would be desirable to provide another method and structure for joining the endcaps of repeaters in submarine optical communication systems to their pressure vessels.

BRIEF SUMMARY OF THE INVENTION

These, and other, drawbacks, limitations and problems associated with conventional optical communication systems are overcome by exemplary embodiments of the present invention, wherein a pressure vessel is machined from a cylindrical section, without any bosses or flanges for endcap attachment. Instead, the endcap is secured using a breech ring. The assembly is sealed using, for example, a face seal and one ore more piston seals, all of which are embedded within the thickness of the pressure vessel. The piston seal(s) provide redundant sealing of the unit. The bell housing can also be secured to the pressure vessel using a keyed arrangement similar to that of the breech ring so that axial loads are passed directly to the pressure vessel from the bell housing.

According to one exemplary embodiment of the present invention, a repeater includes a pressure vessel having a plurality of engaging tabs formed therein, an endcap; and a breech ring, having a plurality of engagement elements formed thereon, for securing the endcap to said pressure vessel. In this way, a secure, removable connection between the endcap and the pressure vessel is provided without increasing the outer diameter of the pressure vessel by using flanges or bosses, while at the same time permitting the axial load to pass directly from the bell housing to the pressure vessel.

Repeaters and pressure vessel joints according to the present invention have a number of benefits over conventional structures. First, the joint is relatively simple to manufacture and assemble. Second, structures according to the present invention reduce the cost of material associated with manufacturing the pressure vessel by minimizing machining waste. Third, efficient load paths are created which transfer loads directly through the pressure vessel and avoid unloading the seals.

DESCRIPTION OF PREFERRED EMBODIMENTS

In the following description, for the purposes of explanation and not limitation, specific details are set forth, such as particular systems, networks, software, components, techniques, etc., in order to provide a thorough understanding of the present invention. However, it will be apparent to one skilled in the art that the present invention may be practiced in other embodiments that depart from these specific details. In other instances, detailed descriptions of known methods, devices and circuits are abbreviated or omitted so as not to obscure the present invention.

Figure 1:
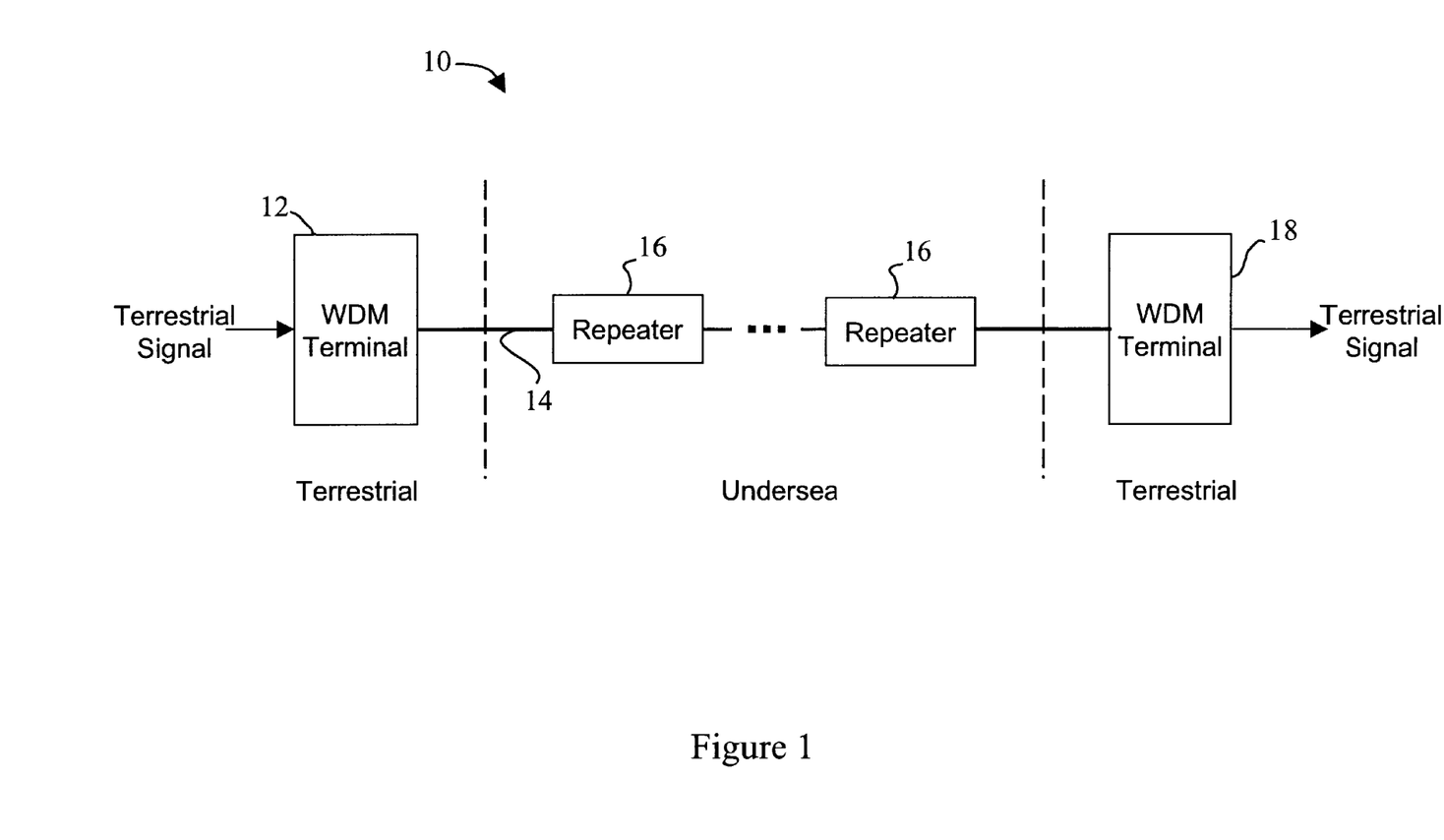
FIG. 1 is a schematic diagram of an optical communication system in which the present invention can be implemented.

Repeaters which enable high power Raman-amplified optical signal transmission systems can be employed in systems such as those depicted in FIG. 1, i.e., submarine optical communication systems, or in terrestrial systems. For the purpose of illustration, rather than limitation, an exemplary Raman-amplified system is described below for context. Those skilled in the art will appreciate that many different system configurations could also utilize repeater designs, structures and techniques according to the present invention.

Figure 4:
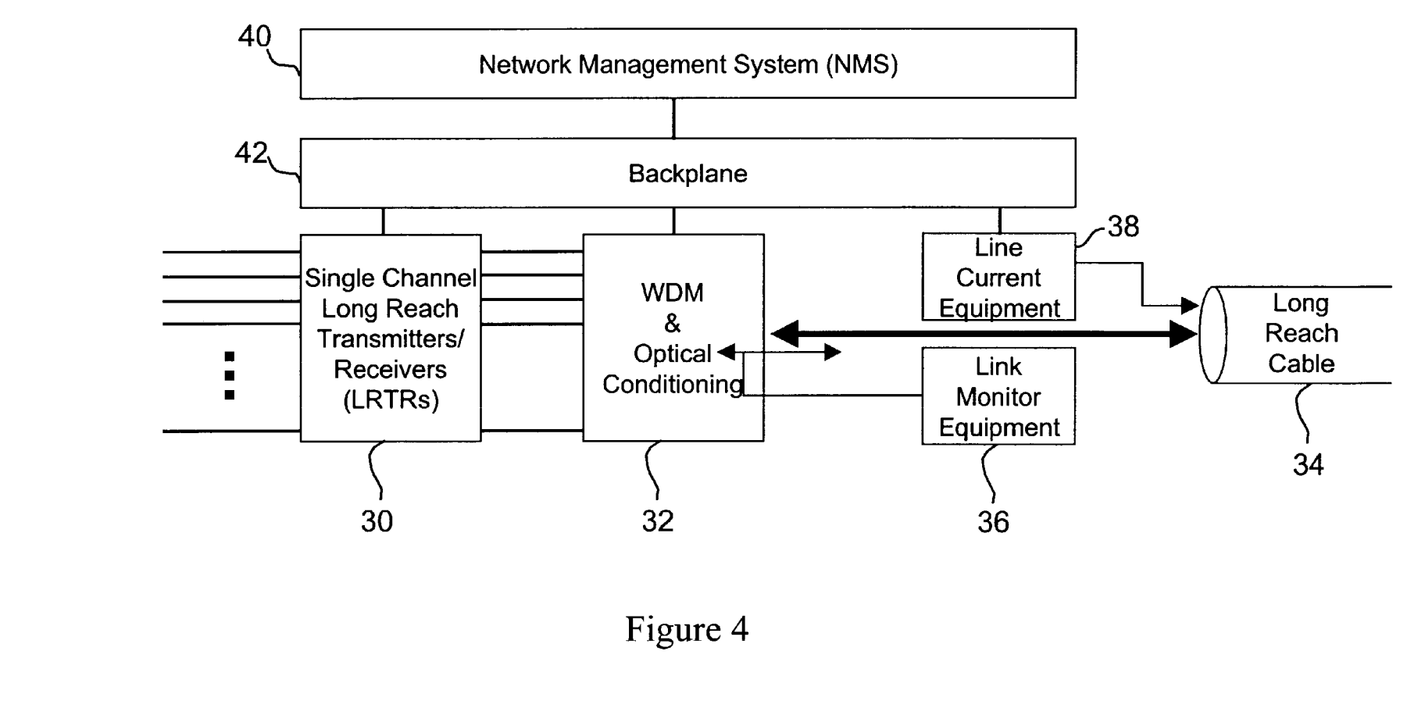
FIG. 4 is a block diagram of an exemplary terminal unit of an optical communication system including link monitoring equipment according to exemplary embodiments of the present invention.

An exemplary architecture for terminal 12 and 18 is provided in the block diagram of FIG. 4. Therein, the long reach transmitters/receivers (LRTRs) 30 convert terrestrial signals into an optical format for long haul transmission, convert the undersea optical signal back into its original terrestrial format and provide forward error correction. The WDM and optical conditioning unit 32 multiplexes and amplifies the optical signals in preparation for their transmission over cable 34 and, in the opposite direction, demultiplexes optical signals received from cable 34. The link monitor equipment 36 monitors the undersea optical signals and undersea equipment for proper operation. The line current equipment 38 provides power to the undersea repeaters 36. The network management system (NMS) 40 controls the operation of the other components in the WDM terminal, as well as sending commands to the repeaters 36 via the link monitor equipment 36, and is connected to the other components in the WDM terminal via backplane 42.

Figure 5:
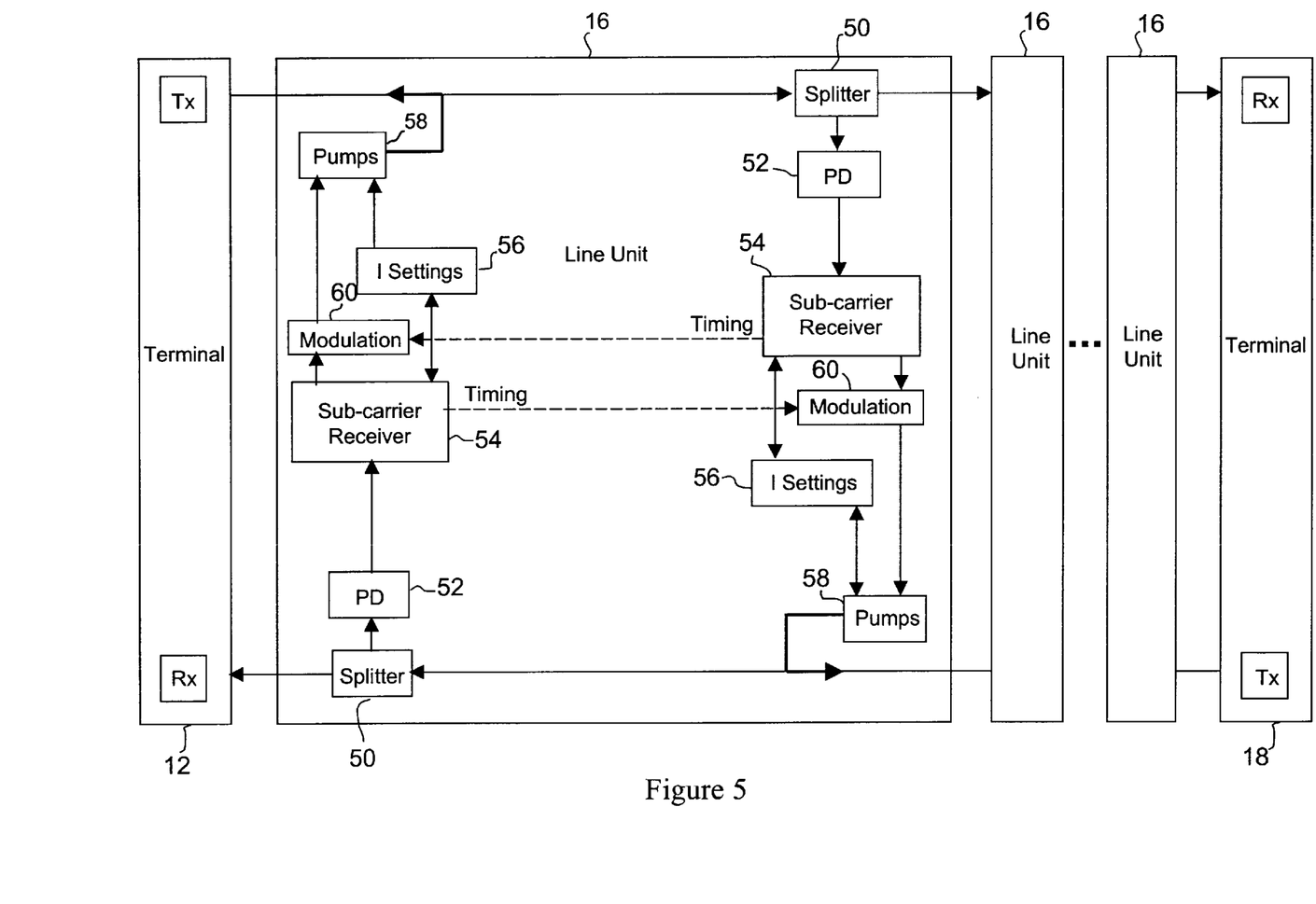
FIG. 5 is a block diagram of an exemplary repeater of an optical communication system in which the present invention can be implemented.

Functional blocks associated with an exemplary repeater 16 are depicted in FIG. 5. Therein, each fiber has a splitter 50 connected thereto to sample part of the traveling WDM data signal. The splitters 50 can, for example, be implemented as 2% couplers. A photodetector 52 receives the sampled optical signal from its respective splitter 50 and transforms the optical signal into a corresponding electrical signal. The photodetector 52 outputs the electrical signal to a corresponding subcarrier receiver unit 54, which detects and decodes the commands present in the subcarrier modulated monitoring signal that has been modulated on the envelope of the WDM data signal. After decoding the command, the particular sub-carrier receiver 54 determines whether the decoded command is intended for it. If so, the action in the command is executed, e.g., measuring the power of the WDM signal, measuring the pump power output from one or more lasers in the pump assembly, or changing the supply current to the lasers of the pump assembly. To this end, the sub-carrier receivers 54 are connected to respective current control and power monitoring units (I settings) 56, which each include pump power monitors and pump current controls for each laser in the associated pump laser assembly 58.

The pump modules 58 provide pump light into the optical fibers to amplify the data signals traveling therein using a Raman amplification scheme, as generally described above.

Figure 6:
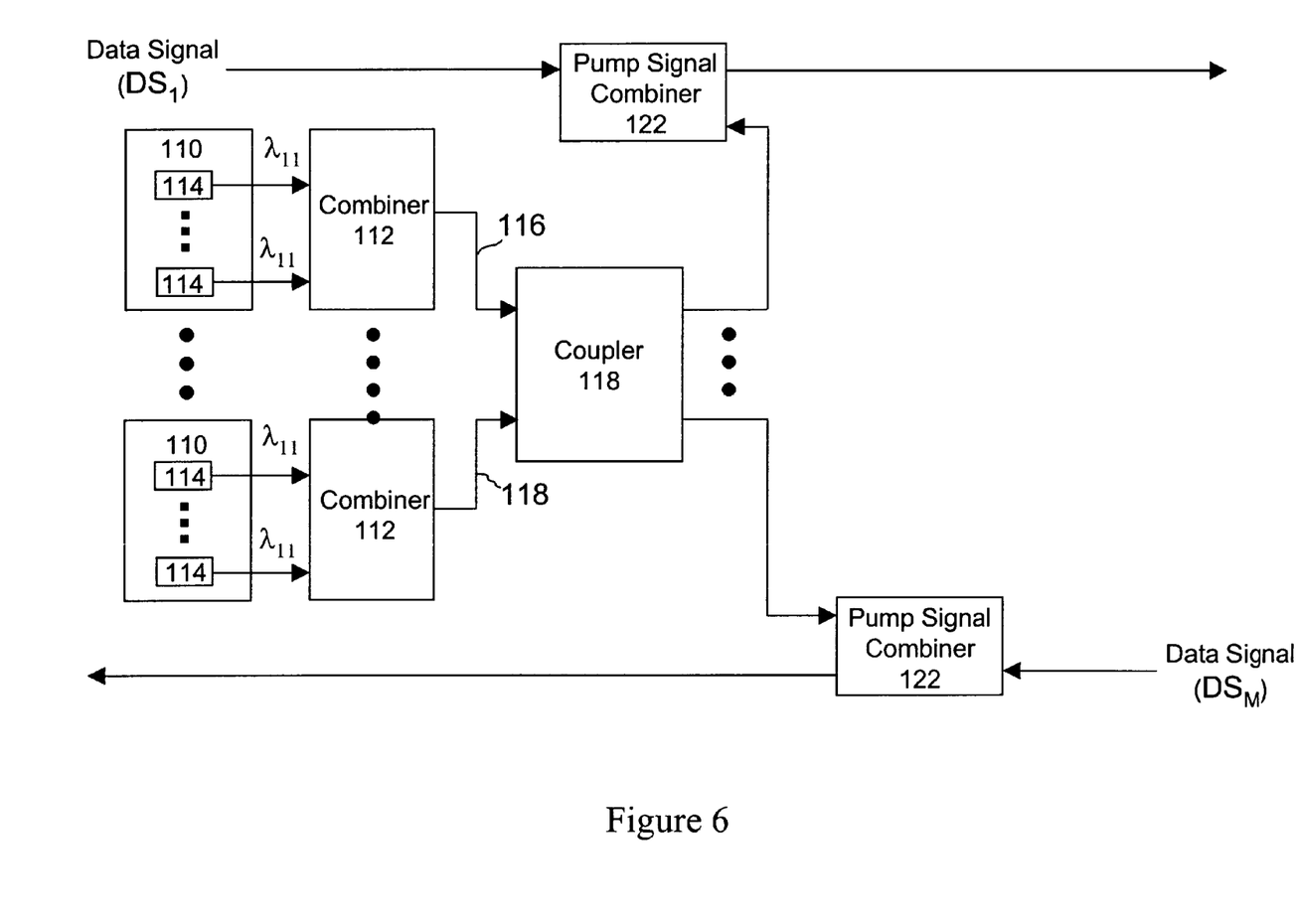
FIG. 6 is another block diagram of an exemplary repeater of an optical communication system including an exemplary Raman pumping architecture.

The gain profile for a single pump wavelength has a typical bandwidth of about 20–30 nm. For high capacity WDM communication applications, such a bandwidth is too narrow and, accordingly, multiple pump wavelengths can be employed to broaden the gain profile. FIG. 6 depicts an exemplary pump architecture for providing multiple pump wavelengths in a Raman amplification scheme.

Therein, a number N of pump radiation sources 110 are optically coupled to a respective one of N pump radiation combiners 112. Each of the pump radiation sources 110 generate various pump wavelengths at various pump powers using individual radiation emitters 114. The individual radiation emitters 114 can, for example, be lasers, light emitting diodes, fiber lasers, fiber coupled microchip lasers, or semiconductor lasers. The combiners 112 combine the various outputs of their respective pump radiation sources, e.g., by wave division multiplexing, and outputs the combined optical pumping signal to coupler 118. Coupler 118 can be an N×M coupler which takes contributions from all N inputs to provide a representative output at each of M output ports. Energy from the coupler 118 is pumped into the optical fiber(s) via pump signal combiners 122. In general, Raman pump architectures couple the light generated by pump lasers at various wavelengths and various powers to the optical fibers to pump the optical data signals. Those skilled in the art will appreciate that many other types of pumping architectures can be employed to provide Raman amplification to optical data signals in accordance with the repeater structures described below. For example, pumping architectures described in commonly assigned, U.S. patent application Ser. Nos. 09/832,175, 09/838,218, 09/838,594, and 09/865,440 filed on Apr. 11, 2001, Apr. 20, 2001, Apr. 20, 2001, and May 29, 2001, respectively, may also be used, the disclosures of which are incorporated here by reference.

Figure 7:
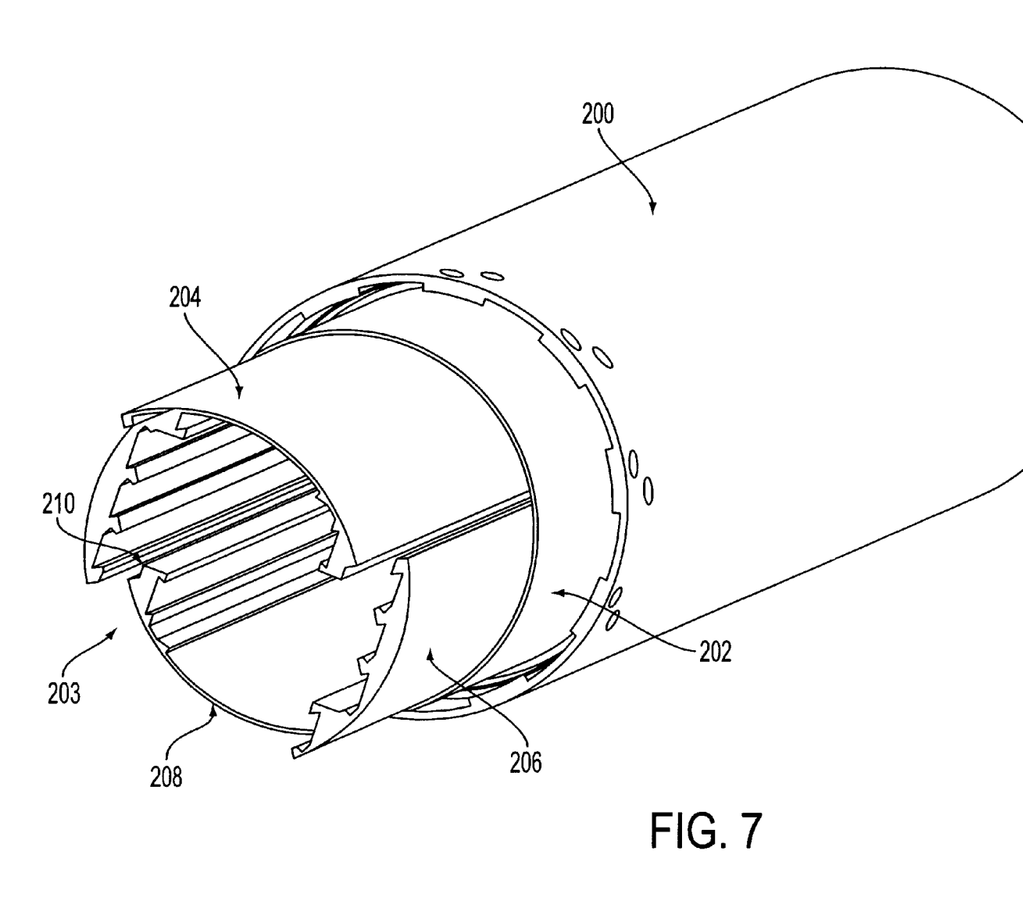
FIG. 7 depicts the various shell layers associated with repeaters according to exemplary embodiments of the present invention.

FIG. 7 illustrates the general shell structure of a repeater 16 according to the present invention from a layered perspective. Specifically, the cylindrical shell 200 is part of the pressure vessel that protects the interior structure and optical/electrical components from a multitude of stresses, both before and after deployment underwater. Desirable physical characteristics for the pressure vessel include high strength, good resistance to corrosion and good thermal conductivity, i.e., to aid in minimizing temperature rises within the repeater due to heat dissipation. Additionally, the pressure vessel should have an extremely low leak rate and provide a wide range of motion for the optical/power cable which enters therein. The pressure vessel can, for example, be fabricated from beryillium-copper alloys (e.g., 1.9% Be), although any materials having the aforementioned characteristics can be used. Pressure vessels according to the present invention can, for example, be approximately 1580 mm long, have an outer diameter of about 380 mm and a wall thickness of about 30 mm.

Inside of the pressure vessel shell 200 is a dielectric layer 202 that electrically insulates the pressure vessel from the optical/electrical components housed therein. As mentioned above, Applicants anticipate that repeaters 16 operating in next generation, high power optical communication systems, e.g., Raman systems, may require more than 40 kV to be supplied thereto. Accordingly the dielectric layer 202 should have a relatively high breakdown voltage while at the same time having a high thermal conductivity. Selection of an appropriate dielectric material given the need for high breakdown protection and thermal conductivity in repeaters according to the present invention is discussed in U.S. Provisional Patent Application Serial No. entitled "Repeater Shell Structure for High Power Optical Communications", filed on an even date herewith, the disclosure of which is incorporated here by reference. The thickness of the dielectric layer 202 can, for example, be about 6 mm.

Inside of the dielectric layer 202, resides an inner frame structure 203. In the example of FIG. 7, this inner frame structure 203 is depicted in four sections 204, 206, 208 and 210. However, as described below, the number of elements which make up the frame structure is not particularly important and it can be fabricated from more or fewer than four elements. If multiple elements are used for the inner frame structure 203, then those elements can be separated by springs or wedge-locks (not shown in FIG. 7). The inner frame structure 203 provides an area within which the optical/electrical components are mounted, the optical fiber is run and the various power connections are made, to provide the optical architectures, e.g., those described above, for amplifying the optical signals passing through the repeaters 16. Having provided an overview as to the various layers and components found in repeaters 16, various features of repeater pressure vessels according to the present invention will be discussed individually below.

Figure 8:
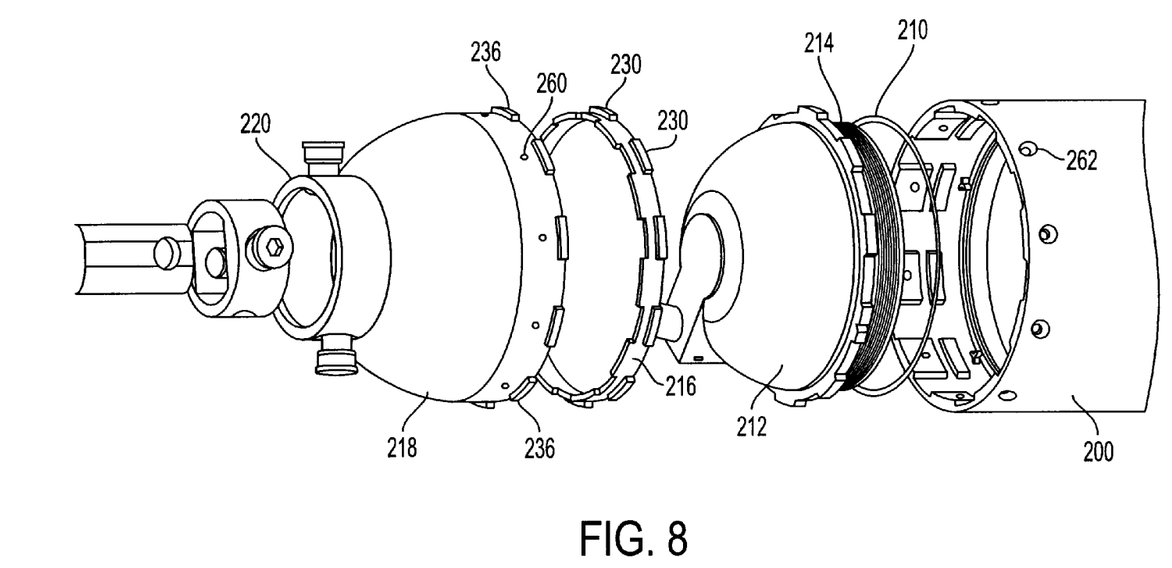
FIG. 8 illustrates an exploded view of one end of a repeater having a pressure vessel joint according to an exemplary embodiment of the present invention.

Referring now to FIG. 8, an exemplary pressure vessel assembly according to an exemplary embodiment of the present invention is depicted in an exploded view. Ad, Therein, various components that are used to removably seal one end of the pressure vessel 200 can be seen. The elements shown therein are designed to seal the interior of the pressure vessel 200 against water, while at the same time provide an entry/exit for the power cable and optical fibers (not shown in this figure). The pressure vessel assembly includes a C-ring 210, a pressure vessel endcap 212 with at least one gasket 214, a breech ring 216 having engagement elements 230, a bell housing 218 having engagement elements 236 and a gimbal 220.

Figure 9:
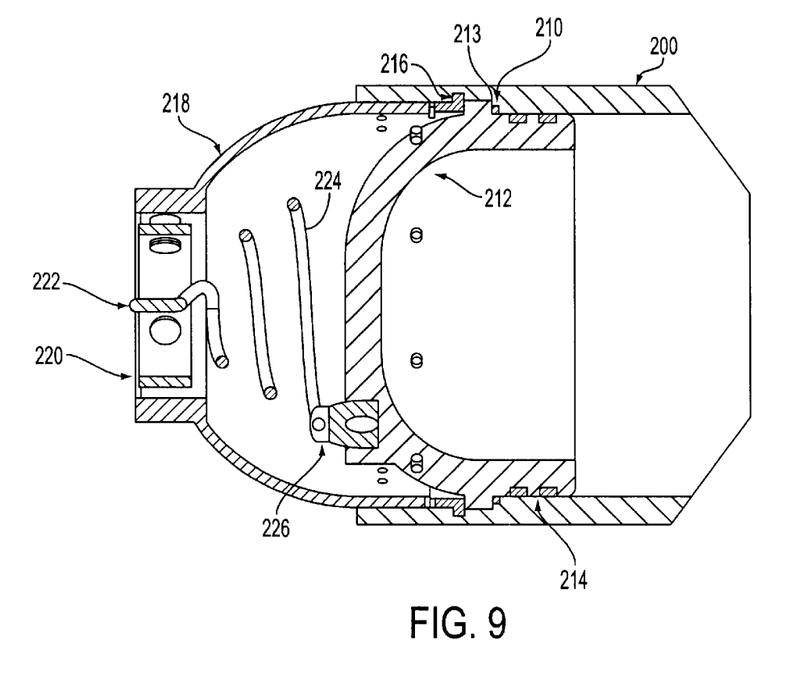
FIG. 9 shows a cross-sectional view of a repeater having a pressure vessel joint according to an exemplary embodiment of the present invention.

FIG. 9 depicts a cross-sectional view of the elements of FIG. 8 in their assembled state. Therein, it can be seen that the breech ring 216 removably secures the pressure vessel end cap 212 within pressure vessel 200 by engaging tabs fabricated within the pressure vessel 200 and a lip formed on the outer surface of pressure vessel endcap 212. The lip of the pressure vessel endcap 212 is, in turn, pressed against the C-ring 210 that is seated in the pressure vessel 200, as well as a shelf 213 formed in the pressure vessel. FIG. 9 also illustrates the penetration of the power cable/optical fibers 224 into repeater 16 through the gimbal 220 at pigtail 222 and, subsequently, through the pressure vessel endcap 212 via waterblock 226. The gasket 214 is, in this example, provided as two piston seals, e.g., to provide redundant sealing against water entry into the pressure vessel 200. Those skilled in the art will appreciate that more or fewer than two such seals may be used. The distribution of the engagement features around the circumference of the pressure vessel in which the C-ring 210 and gasket 214 (wedge pack piston seals) are located is designed to avoid concentration of stresses caused by depth pressure when the repeater 16 is deployed. This, in turn, maintains the C-ring 210 and gasket 214 in their loaded states.

Figure 10:
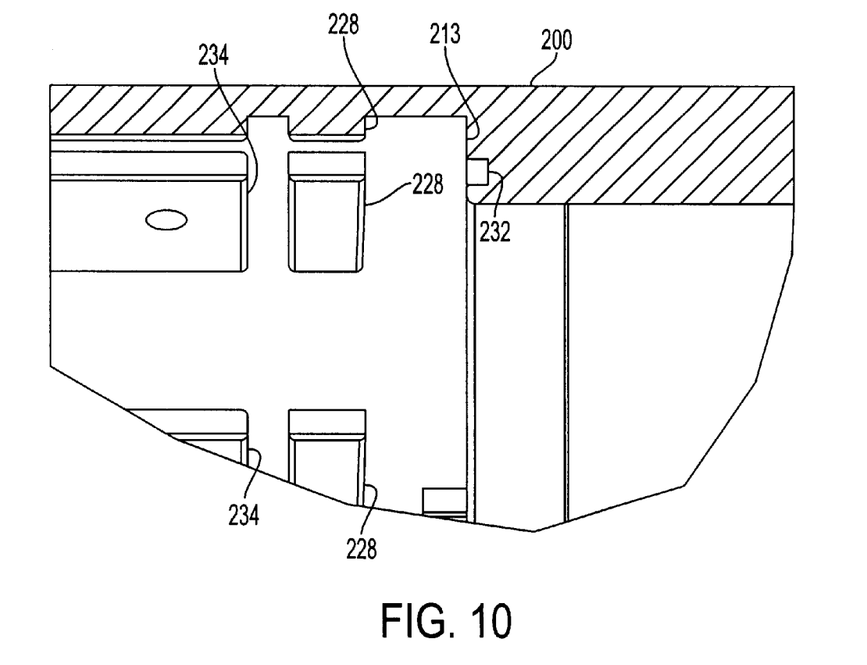
FIG. 10 is an enlarged, cross-section of the interior of a pressure vessel according to an exemplary embodiment of the present invention.

The engagement features of the pressure vessel 200 that co-operate with the breech ring 216 to lock the pressure vessel endcap 212 in place can be seen in FIG. 10. Therein, a series of indexed tabs 228 are formed inside pressure vessel 200. The tabs 228 and corresponding engagement elements 230 on the breech ring 216 can be tapered, e.g., at about 2 degrees, to promote a compression fit between the tabs 228 and engagement elements 230 when assembled. Tabs 228 and breech ring 216 maintain a large force (e.g., 1000 lb/inch) on C-ring 210 to create a low leak rate pressure vessel. A similar set of tabs 234 can be provided axially outwardly of the tabs 228 inside of pressure vessel 200 to lock bell housing 218 into place using its corresponding engagement elements 236. Once this is accomplished, the bell housing can be further secured by pins (not shown) that are inserted through holes 260 in the bell housing 218 and corresponding holes 262 in the pressure vessel 200 (FIG. 8). Those skilled in the art will appreciate that other locking mechanisms can be used as alternatives. These pins provide resistance against any torsional loads that may be encountered during deployment of the repeater 16. Also seen in FIG. 10 is the seat 232 for the C-ring 210.

Figure 11:
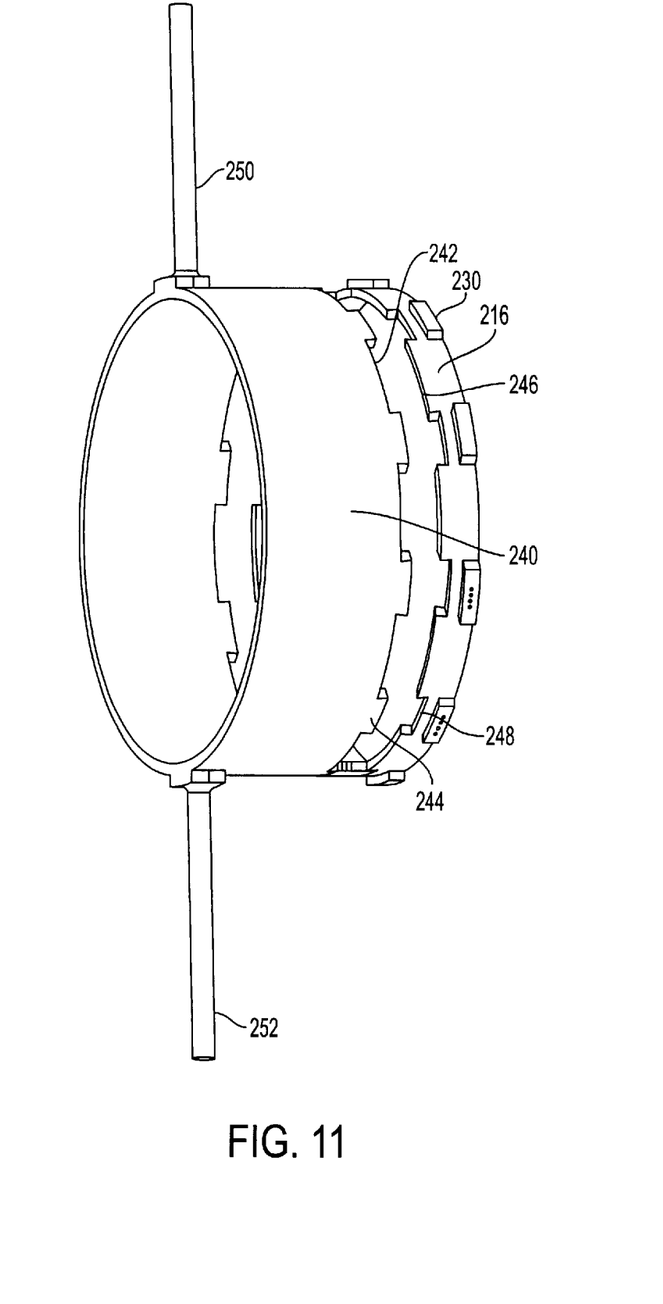
FIG. 11 illustrates a breech ring and breech ring installation tool according to an exemplary embodiment of the present invention.

To secure the pressure vessel endcap 212 in place, a breech ring installation tool 240 (FIG. 11) can be used. The breech ring tool 240 has a series of indents 242 and tabs 244 which mate with corresponding tabs 246 and indents 248 on an upper side of the breech ring 216. With the pressure vessel endcap 212 seated against C-ring 210 and shelf 213, the breech ring installation tool is inserted into mating relationship with breech ring 216 and a suitable amount of torque is applied to rotate the breech ring 216 such that engagement elements 230 are positioned under the indexed tabs 228. In accordance with one exemplary embodiment of the present invention, the C-ring 210 is preloaded with a press (e.g., a 20+ton arbor press, not shown) during the breech ring locking operation. In this way, the amount of torque needed to secure the breech ring is relatively low. Accordingly, the breech ring tool 240 can be manually operated using handles 250 and 252. Those skilled in the art will appreciate that although a manual operation is discussed and illustrated here, that breech ring installation tool 240 could also be implemented using an automated power source.

Manufacturing of the aforedescribed elements of pressure vessel assemblies according to the present invention can be accomplished in a number of different ways. For example, the pressure vessel 200 and endcap 212 can be forged and post machined. Since no flanges are provided for endcap attachment, extrusions and rolled rings can be used for the cylindrical section from which the pressure vessel is m machined, which reduces machining waste associated with flanged forged pressure vessels. The bell housing 218 can be centrifugally cast or sand cast and post machined. The breech ring 216 can be ring forged or machined from plate metal stock.

The preferred embodiments have been set forth herein for the purpose of illustration. However, this description should not be deemed to be a limitation on the scope of the invention. For example, although the foregoing exemplary embodiments depict the endcap as having a generally hemispherical shape, those skilled in the art will appreciate that the endcap could be elliptical or flat. Accordingly, various modifications, adaptations, and alternatives may occur to one skilled in the art without departing from the scope of the claimed inventive concept.

What is claimed is:

1. A repeater for use in amplifying optical signals in a submarine optical communication system comprising:

a pressure vessel;

an endcap that includes a lip having first and second sides, which lip abuts a shelf formed in said pressure vessel on said first side thereof; and means for rotatably securing said endcap to said pressure vessel without using threads, wherein said means for rotatably securing comprises:

a plurality of engagement elements configured to engage with a plurality of engaging tabs in said pressure vessel and said second side of said lip of said endcap to secure said endcap to said pressure vessel.

2. The repeater of claim 1, further comprising:

a seat formed adjacent to said shelf in said pressure vessel for carrying a spring, wherein said spring presses said first side of said lip of said endcap.

3. The repeater of claim 2, wherein said spring is a C-ring.

4. The repeater of claim 1, further comprising:

at least one seal disposed between said endcap and said pressure vessel.

5. The repeater of claim 4, wherein said at least one seal is disposed axially inwardly of said lip.

6. The repeater of claim 4, wherein said at least one seal comprises at least one piston seals.

7. The repeater of claim 1, further comprising:

a bell housing attached to said pressure vessel at a location which is disposed axially outwardly of said endcap.

8. The repeater of claim 7, further comprising:

a gimbal connected to said bell housing for permitting entry of an optical/power cable therein.

9. A repeater for use in amplifying optical signals in a submarine optical communication system comprising:

a pressure vessel;

an endcap;

means for rotatably securing said endcap to said pressure vessel without using threads; and a bell housing attached to said pressure vessel at a location which is disposed axially outwardly of said endcap, wherein said bell housing has a second plurality of engaging elements formed thereon for attaching said bell housing to said pressure vessel.

10. A repeater for use in amplifying optical signals in a submarine optical communication system comprising:

a pressure vessel;

an endcap;

means for rotatably securing said endcap to said pressure vessel without using threads; and a bell housing attached to said pressure vessel at a location which is disposed axially outwardly of said endcap, wherein said bell housing has a second plurality of engaging elements formed thereon for attaching said bell housing to said pressure vessel, wherein said pressure vessel has a second plurality of engaging tabs formed thereon for interactive engagement with said second plurality of engaging elements on said bell housing.

* * * * *